Nov. 22, 1955     W. R. L. STEPTOE     2,724,476
BALE TURNER
Filed March 15, 1954     2 Sheets-Sheet 1
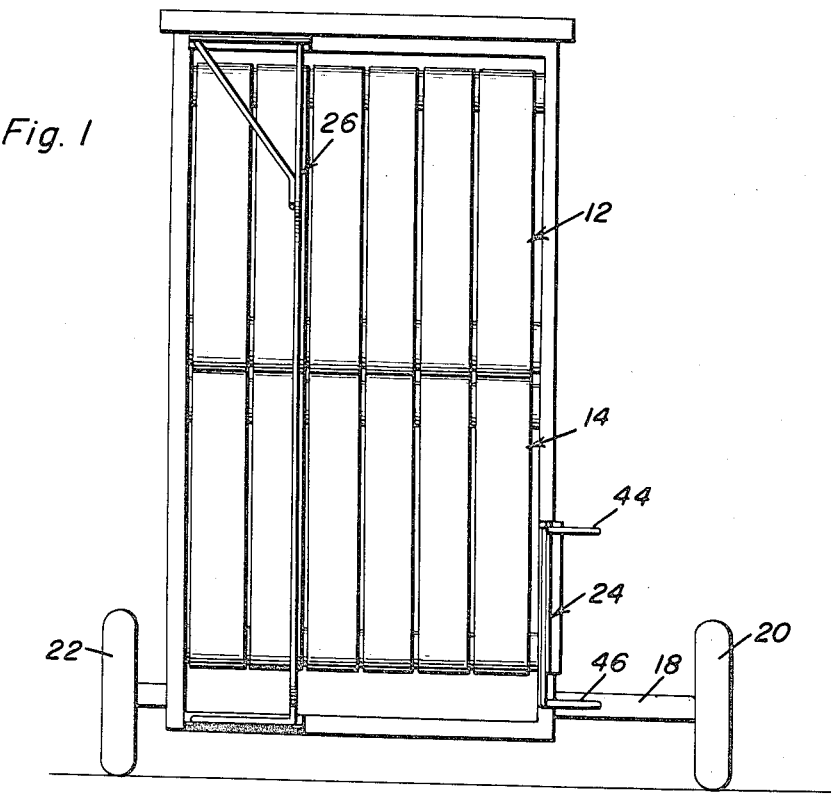
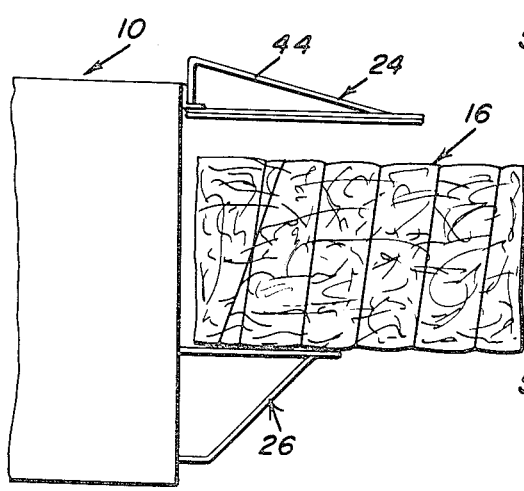
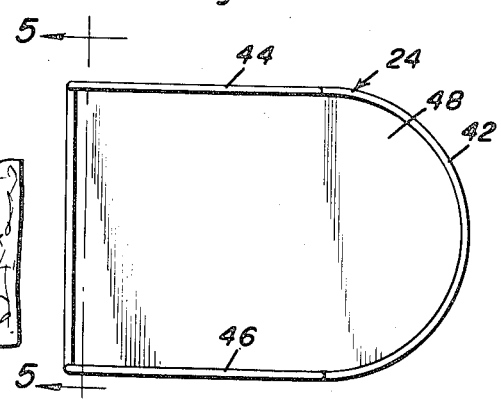
William R. L. Steptoe
INVENTOR.

Nov. 22, 1955  W. R. L. STEPTOE  2,724,476
BALE TURNER
Filed March 15, 1954  2 Sheets-Sheet 2
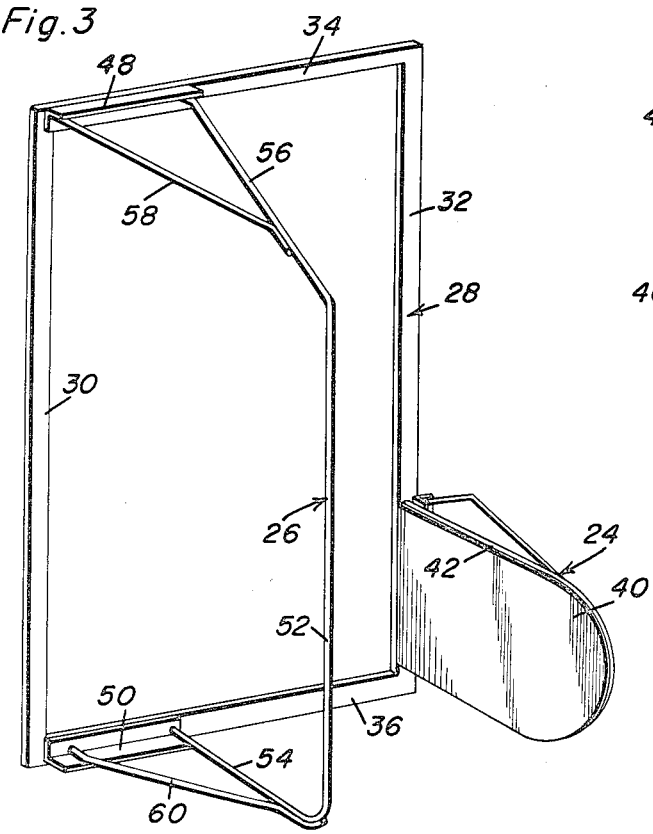
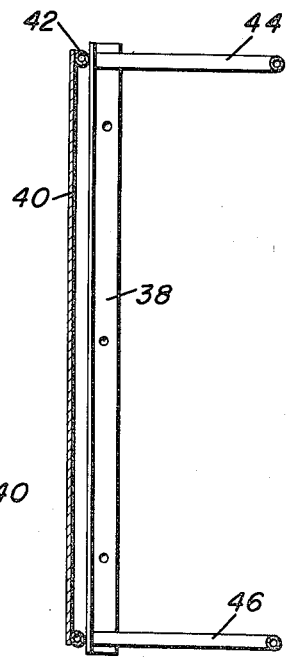
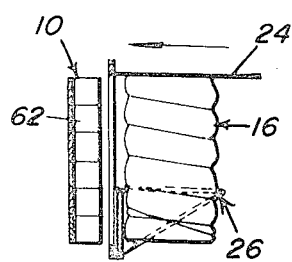
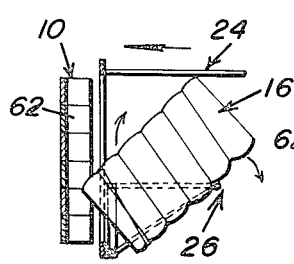
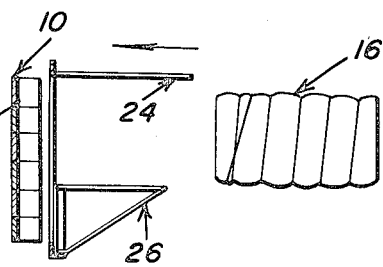
William R. L. Steptoe
INVENTOR.

2,724,476
BALE TURNER

William R. L. Steptoe, Miller, S. Dak.

Application March 15, 1954, Serial No. 416,267

3 Claims. (Cl. 193—5)

This invention relates generally to attachments for balers and pertains more particularly to an attachment which is adapted to turn bales as they are discharged from a conventional baling machine through an angle of 90 degrees such that they are disposed in longitudinal alignment in the field in which they are discharged to permit subsequent mechanical picking up operation to be effected more rapidly.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an end elevational view showing the bale turner attached to the conventional baling machine;

Figure 2 is a top plan view of the assembly shown in Figure 1;

Figure 3 is a perspective view of the turning attachment;

Figure 4 is a rear view of the guide plate member;

Figure 5 is a transverse section taken substantially along the plane of section line 5—5 in Figure 4; and Figures 6, 7 and 8 are sequential views showing the attachment in the process of turning a bale.

Referring now more particularly to the drawings, reference numeral 10 indicates any type of conventional baling machine generally which may include the overlapping conveyor assemblies 12 and 14, which in this instance are of the type which form the bales in rolls, such a rolled bale being indicated generally by the reference character 16. A supporting axle for the baler is indicated by the reference character 18, the wheels 20 and 22 associated therewith being provided for movably supporting the baler for transportation.

Normally, with this type of baling machine, the bales are discharged from the machine in such a manner that their longer axes are disposed in parallel relation. After a field has been cut and baled in this manner, it is conventional in practice to utilize a truck having a bale loader attached thereto for the purpose of loading the bales upon the truck. Such bale loaders are conventional and well known in the art and incorporate spaced arm members, one of which is caused by manipulation of the driving vehicle, to hit the bale being loaded at just the right distance from one end thereof so that the bale will turn lengthwise without hitting the other arm. The bale is then in position lengthwise with respect to the longitudinal axis of the loader and can be picked up thereby for loading onto the truck.

This method of loading bales is undesirable inasmuch as it requires perfect driving by the operator to engage the arm against the bale to turn the same and even with an experienced and skillful operator the travel of the driving vehicle must necessarily remain very slow. To overcome these objectionable features, the hereinafter described bale turner mechanism is provided for connection directly to the rear portion of a baler, the turner forcing the bales to be discharged lengthwise behind the baler such that during the loading operation it is not necessary for the driving vehicle to which the loader is attached to be skillfully driven in order to pick up the bales. Moreover, the attachment will permit even an unskilled loader operator to travel at a much faster rate than the skilled operator could, under the previously mentioned conditions of normal discharge from a conventional baler.

The bale turner consists essentially of a guide plate assembly, indicated generally by the reference character 24 and a turning bar assembly indicated generally by the reference character 26. These assemblies may be connected directly to the rearward end of a conventional baling machine or may be provided with an open rectangular framework 28 which consists of the spaced side pieces 30 and 32 interconnected at their top and bottom ends by the cross pieces 34 and 36, respectively. A suitable anchor plate 38 is rigidly attached to either the frame or the baler and the guide plate 40, having a peripheral stiffening member 42 secured thereto, is rigidly attached at one end to the member 38 in trailing relation to the baler. Angulated brace arms 44 and 46 are secured at opposite ends to the member 38 and a rearward portion of the plate 40 for rigidifying the same.

The turner assembly is secured at the opposite side of the frame 28 or the discharge opening of the baler and for this purpose the mounting members 48 and 50, upper and lower, respectively, are provided. These members attach rigidly to either the frame or the baler and the turning rod assembly is secured therebetween. The turning bar assembly consists essentially of the upright turning bar member 52 having a horizontal leg 54 at its lower end secured to the member 50 and an angulated leg 56 at its upper end secured to the member 48 with the upper and lower brace arms 58 and 60, respectively, extending between the members 48 and 50 and the arms 56 and 54, respectively, to brace the entire assembly.

Referring now more particularly to Figures 6-8, the discharge platform of the baler is indicated by the reference character 62 and it will be appreciated that the bales are normally discharged therefrom in the position shown in Figure 6. However, with the attachment in place, the guide plate assembly 24 will engage against one end of the bale 16 to prevent its accidental shifting to one side so as to permit the opposite end of the bale to roll on the horizontal leg 54 and the brace 60 until it engages the upstanding turning bar member 52 such that the sequential turning operations indicated in Figures 7 and 8 will be effected to discharge the bales in lengthwise position. It will be noted that during the discharge operation with the attachment in place, one end of the bale is supported a moment longer than the opposite end thereof due to the fact that no support is provided adjacent the guide plate whereas the leg 54 and brace 60 support the opposite end of the bale, which will permit the rearward end of the bale to strike against the ground first such that the forward movement of the baling machine will assure that the bale is discharged in a lengthwise position as shown in Figure 8.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A turning mechanism for use with a baler, comprising an open frame adapted to be secured to a baler at the discharge opening thereof, a trailing guide plate secured to one side of said frame and extending rearwardly from one side of the opening to engage against one end of a bale, a vertical turning bar secured to the opposite side of said frame and positioned rearwardly thereof and extending over the opening to engage against the opposite end of a bale to rotate the same for discharge in a position rotated 90 degrees from the normal discharge position.

2. A turning mechanism for use with a baler, comprising an open frame adapted to be secured to a baler at the discharge opening thereof, a rearwardly extending vertical guide plate secured to one side of said frame at one side of the discharge opening and adapted to engage against one end of a discharged bale, a turning bar assembly secured to said frame at the opposite side of the discharge opening in laterally spaced relation to said guide plate, said assembly including rearwardly directed upper and lower horizontal arm members interconnected at their free rearward ends by an upright extending over said opening, said upright and guide plate being spaced apart a distance less than the length of a bale to engage an associated laterally disposed bale adjacent the end thereof opposite the end engaged against said guide plate, whereby the bale will be turned 90 degrees from its normal discharged position.

3. A turning mechanism for use with a baler, comprising an open frame adapted to be secured to a baler at the discharge opening thereof, a rearwardly extending guide plate secured to one side of said frame and adapted to engage against one end of a discharged bale, a turning bar assembly secured to said frame in laterally spaced relation to said guide plate, said assembly including rearwardly directed upper and lower arm members interconnected at their free rearward ends by an upright, said upright being so positioned with respect to said guide plate as to engage an associated laterally disposed bale adjacent the end thereof opposite the end engaged against said guide plate, whereby the bale will be turned 90 degrees from its normal discharged position, a brace secured between said frame and the rearward end of said lower arm and disposed in rearwardly converging relation thereto, whereby to support the associated end of a bale.

References Cited in the file of this patent
UNITED STATES PATENTS

| | | |
|---|---|---|
| 1,325,339 | Swasey | Dec. 16, 1919 |
| 2,529,842 | Jones et al. | Nov. 14, 1950 |